(12) United States Patent
Golodnitsky et al.

(10) Patent No.: US 9,249,522 B2
(45) Date of Patent: Feb. 2, 2016

(54) ELECTROPHORETIC DEPOSITION OF THIN FILM BATTERIES

(75) Inventors: Diana Golodnitsky, Rishon-LeZion (IL); Emanuel Peled, Even-Yehuda (IL); Menachem Nathan, Tel Aviv (IL); Gilat Ardel, Givat Ada (IL); Hadar Mazor-Shafir, Herzlia (IL); Roni Hadar, Kibutz Gan Shmuel (IL); Svetlana Menkin-Bachbut, Kfar-Yona (IL); Tania Ripenbein, Natania (IL); Kathrin Freedman, Tsoran (IL)

(73) Assignee: Ramot at Tel-Aviv University Ltd., Tel-Aviv (IL)

( * ) Notice: Subject to any disclaimer, the term of this patent is extended or adjusted under 35 U.S.C. 154(b) by 74 days.

(21) Appl. No.: 13/988,337

(22) PCT Filed: Dec. 5, 2011

(86) PCT No.: PCT/IB2011/002916
§ 371 (c)(1),
(2), (4) Date: May 19, 2013

(87) PCT Pub. No.: WO2012/076950
PCT Pub. Date: Jun. 14, 2012

(65) Prior Publication Data
US 2013/0244102 A1   Sep. 19, 2013

Related U.S. Application Data

(60) Provisional application No. 61/419,885, filed on Dec. 5, 2010.

(51) Int. Cl.
| | |
|---|---|
| *C25D 13/02* | (2006.01) |
| *H01M 2/02* | (2006.01) |
| *H01M 2/10* | (2006.01) |
| *H01M 2/16* | (2006.01) |
| *H01M 2/18* | (2006.01) |
| *H01M 4/04* | (2006.01) |
| *H01M 4/133* | (2010.01) |
| *H01M 4/136* | (2010.01) |
| *H01M 4/1393* | (2010.01) |
| *H01M 4/1397* | (2010.01) |
| *H01M 4/36* | (2006.01) |
| *H01M 4/58* | (2010.01) |
| *H01M 4/583* | (2010.01) |
| *H01M 10/04* | (2006.01) |
| *H01M 10/0525* | (2010.01) |

(Continued)

(52) U.S. Cl.
CPC ............ *C25D 13/02* (2013.01); *H01M 2/0202* (2013.01); *H01M 2/0275* (2013.01); *H01M 2/0277* (2013.01); *H01M 2/1094* (2013.01); *H01M 2/1646* (2013.01); *H01M 2/1673* (2013.01); *H01M 2/18* (2013.01); *H01M 4/0404* (2013.01); *H01M 4/0407* (2013.01); *H01M 4/0438* (2013.01); *H01M 4/0457* (2013.01); *H01M 4/133* (2013.01); *H01M 4/136* (2013.01); *H01M 4/1393* (2013.01); *H01M 4/1397* (2013.01); *H01M 4/366* (2013.01); *H01M 4/583* (2013.01); *H01M 4/5825* (2013.01); *H01M 10/0436* (2013.01); *H01M 10/058* (2013.01); *H01M 10/0525* (2013.01); *H01M 10/0562* (2013.01); *H01M 6/40* (2013.01); *H01M 2300/002* (2013.01); *H01M 2300/0068* (2013.01); *H01M 2300/0074* (2013.01); *H01M 2300/0077* (2013.01); *Y02E 60/122* (2013.01)

(58) Field of Classification Search
CPC ............ H01M 2/0202; H01M 2/0277; H01M 2/1094; H01M 2/1646; H01M 2/1673; H01M 2/18; H01M 4/0404; H01M 4/0407; H01M 4/0438; H01M 4/0457; H01M 4/133; H01M 4/136; H01M 4/1393; H01M 4/1397; H01M 4/366; H01M 4/5825; H01M 4/583; C25D 13/02
See application file for complete search history.

(56) References Cited

U.S. PATENT DOCUMENTS

| | | | | |
|---|---|---|---|---|
| 6,197,450 | B1 * | 3/2001 | Nathan et al. | 429/236 |
| 6,475,677 | B1 * | 11/2002 | Inda et al. | 429/304 |

(Continued)

FOREIGN PATENT DOCUMENTS

| | | |
|---|---|---|
| EP | 1424743 A1 | 6/2004 |
| EP | 1770817 A2 | 4/2007 |

(Continued)

OTHER PUBLICATIONS

Van Der Biest et al., Annu. Rev. Mater. Sci., vol. 29, 1999, pp. 327-352.

(Continued)

*Primary Examiner* — Muhammad Siddiquee
(74) *Attorney, Agent, or Firm* — Nathan & Associates Patent Agents Ltd.; Menachem Nathan

(57) ABSTRACT

Methods for forming three-layer thin-film battery (TFB) structures by sequential electrophoretic deposition (EPD) on a single conductive substrate. The TFBs may be two-dimensional or three-dimensional. The sequential EPD includes EPD of a first battery electrode followed by EPD of a porous separator on the first electrode and by EPD of a second battery electrode on the porous separator. In some embodiments of a Li or Li-ion TFB, the separator includes a Li ion conducting solid. In some embodiments of a Li or Li-ion TFB, the separator includes an inorganic porous solid rendered ionically conductive by impregnation with a liquid or polymer. In some embodiments, the TFBs are coated and sealed with an EPDd PEEK layer.

20 Claims, 9 Drawing Sheets

(51) Int. Cl.
*H01M 10/0562* (2010.01)
*H01M 10/058* (2010.01)
*H01M 6/40* (2006.01)

(56) References Cited

U.S. PATENT DOCUMENTS

| | | | |
|---|---|---|---|
| 7,662,265 | B2 | 2/2010 | Chiang et al. |
| 7,772,800 | B2 | 8/2010 | Notten et al. |
| 8,691,450 | B1* | 4/2014 | Srinivasan et al. ............ 429/344 |
| 2002/0058578 | A1* | 5/2002 | Shindo ............................ 501/67 |
| 2007/0212603 | A1 | 9/2007 | Golodnitsky et al. |
| 2010/0183915 | A1 | 7/2010 | Tamachi et al. |
| 2011/0186117 | A1* | 8/2011 | Kumar et al. ................. 136/256 |

FOREIGN PATENT DOCUMENTS

| | | |
|---|---|---|
| WO | WO0025378 A1 | 5/2000 |
| WO | WO2008089110 A1 | 1/2008 |
| WO | WO2008089110 A1 | 7/2008 |

OTHER PUBLICATIONS

Corni et al., J. Europ. Ceram. Soc., vol. 28, 2008, pp. 1353-1367.
Kanamura et al., Electrochemical and Solid-State Letters, vol. 3, 2000, pp. 259-262.
Kanamura et al., J. Power Sources, vol. 97-98, 2001, pp. 294-297.
Caballero et al., J. Power Sources, vol. 158, 2005, pp. 583-590.
Munakata et al., Functional Mater. Lett., vol. 2, No. 1, 2009, pp. 9-12.
Averbuch et al., J. Power Sources, vol. 196, 2011, pp. 1521-1529.
Jeffrey W. Fergus, "Ceramic and polymeric solid electrolytes for lithium-ion batteries", JJ. Power Sources, vol. 195, No. 15, Aug. 1, 2010, pp. 4554-4569.
H. Mazor et al, "High Power Copper Sulfide Cathodes for Thin-Film Microbatteries", Electrochemical and Solid-State Letters, vol. 12, No. 12, Jan. 1, 2009, pp. A232-A235.
Besra et al., Progress in Materials Science, vol. 52, 2007, pp. 1-61.
Long et al., Chem. Rev., vol. 104, 2004, pp. 4463-4492.
PCTIB2011002916 Search Report and Written Opinion, Jun. 2013.

* cited by examiner

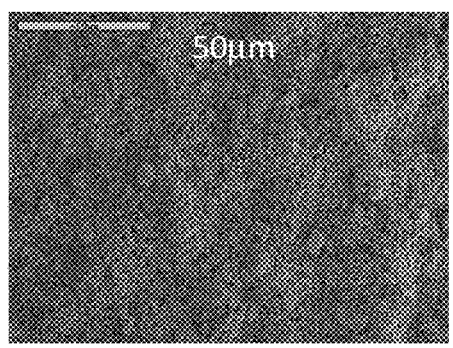 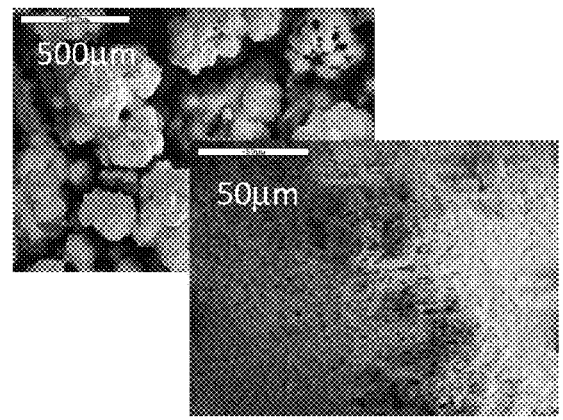
FIG. 4A                    FIG. 4B

ELECTROPHORETIC DEPOSITION OF THIN FILM BATTERIES

CROSS REFERENCE TO RELATED APPLICATIONS

This application is a National Phase application of PCT patent application PCT/IB2011/002916 and is related to and hereby claims the priority benefit of U.S. Provisional Patent Application No. 61/419,855 titled "Electrophoretic deposition of thin film energy storage devices" filed Dec. 5, 2010, which is incorporated herein by reference in its entirety.

FIELD

Embodiments disclosed herein relate generally to energy storage devices and more particularly to electrophoretic deposition (EPD) of thin film batteries (TFBs) in both two-dimensional (2D) and three-dimensional (3D) configurations.

BACKGROUND

TFBs comprise a "stack" of two, one negative ("anode") and one positive ("cathode") thin-film active material electrode layers (referred to henceforth simply as "electrodes") separated by an ionically conducting and electronically insulating ("non-conducting") separator layer. Hereinafter, the various battery layers are mentioned without use of the word "layer". The thickness of each electrode may range from sub-micrometer ("sub-micron") to a few microns. The thickness of the separator may range from sub-micron to a few tens of microns. The stack is formed on a substrate. If one or both electrodes are not sufficiently electronically conductive, thin film current collectors ("CC"s) are provided to facilitate electron current flow in an external circuit. One such CC is formed on the substrate prior to the formation of the TFB stack.

3D-TFBs, as disclosed for example in U.S. Pat. No. 6,197,450 to Nathan et al., are formed inside perforations (through-holes or cavities) of a substrate as well as on any remaining original (planar) surface of the substrate. Each perforation may include a partial or full stack of concentric layers forming a "concentric microbattery" or "CMB". Such 3D-TFBs combine the known advantages of 2D-TFBs with an order of magnitude and more increase in power and energy per footprint (original substrate area). A general known problem with CMBs is the difficulty of forming a solid separator using wet chemistry. Also, known art does not teach electrochemical deposition of a full three layer battery stack.

"Electrophoresis" refers to the motion of charged particles in a liquid under an applied electric field. Electrophoresis can be used to deposit materials in the form of thin films (layers), coatings and bulk products. The deposition process is commonly termed "electrophoretic deposition" (EPD). Reviews of EPD include those by Van der Biest and Vandeperre, Ann. Rev. Mater. Sci., 29 (1999) 327-352 and by Corni et al., J. Europ. Ceram. Soc., 28 (2008) 1353-1367. The EPD of layers faces a hurdle in the requirement that the solid to be deposited be available as a colloidal suspension or powder with grains smaller that a required layer thickness.

EPD has been used to produce bulk battery electrodes, see e.g., Kanamura et al., Electrochemical and Solid-State Letters, 3 (2000) 259-262, and Kanamura et al., J. Power Sources, 97-98 (2001) 294-297. The use of EPD to prepare film (thick or thin) battery components has been extremely limited, and applied mainly to positive electrodes (cathodes). Structures and materials investigated include thick films of $LiNi_{0.5}Mn_{1.5}O_4$ [Caballero et al., J. Power Sources 158 (2005) 583-590] and relatively thin films of $Li_4Ti_5O_{12}$ [Sugiura et al., Functional Mater. Lett. 2(1) (2009) 9-12]. A general concern and trend in the EPD of TFB electrodes it to make them dense (as opposed to porous).

Electrophoretic assembly of electrochemical devices is also disclosed by Chiang et al. in U.S. Pat. No. 7,662,265. Their methods require always use of two current collectors ("terminals") for EPD of mutually repulsive electrodes, and cannot be used to EPD TFBs on a single current collector.

SUMMARY

Embodiments disclosed herein provide methods to produce partial or full thin-film battery stacks on both planar (2D) and 3D substrates using EPD. Henceforth in this specification, the term "EPDd" means "electrophoretically deposited". Layers of a battery stack are EPDd in sequence on a single electronically conductive substrate which can be either in bulk form or in film form. Typically, the single conductive substrate also serves as a first current collector. In some embodiments, a first polarity electrode and a separator are EPDd in sequence to form a two-layer stack, with a second, opposite polarity electrode added to complete a TFB stack. In some embodiments, a "three-layer" electrode-separator-electrode battery stack is EPDd in sequence on a single current collector. In some embodiments, the separator includes an electronically insulating inorganic porous solid. As used herein, "porous solid" refers to a continuous solid structure having porosity of varying degrees. This definition does not inorganic solid powders dispersed in an organic matrix, where the "solid" phase is not continuous. Advantageously, the porous solid provides pathways for cations (e.g. protons), which lose their positive charge (reduce) on the first polarity electrode.

In some embodiments, the inorganic porous solid is an oxide. In some embodiments, the inorganic porous solid is a glass-ceramic. The inventors prepared glass-ceramic powders of small enough size (diameter) for EDP of separators inside through-holes having aspect ratios (AR) of length to diameter greater than 1 and diameters of exemplarily 50 µm. Electrochemical deposition of conformal thin films of glass-ceramics inside holes with AR greater than 1, greater than 5 and even greater than 10, wherein the hole diameters are on the order of a few tens of microns, is extremely difficult. The inventors are unaware of any successful EPD of a glass-ceramic layer inside through holes, or, for that matter, on planar substrates The inventors managed to overcome significant technical difficulties in developing EDP processes for such layers.

In some embodiments, the first polarity electrode is a cathode and the second polarity electrode is an anode. In some embodiments, the order of the electrodes is reversed. In some embodiments, the EPDd two-layer or three-layer structures are impregnated with an ion-conductive liquid (electrolyte).

In some embodiments, the single conductive substrate is a thin-film current collector formed on a fully-perforated substrate (having through-holes as e.g. in U.S. Pat. No. 6,197,450) or on a semi-perforated substrate (with non-through-holes, as e.g. in U.S. Pat. No. 7,772,800). As used herein, the term "through-hole" indicates a perforation of any shape which extends between and penetrates two opposite and substantially planar surfaces bounding a substrate. Non-limiting examples of through-holes may be found in Averbuch et al., J. Power Sources, 196 (2011) 1521-1529. A TFB in which a three-layer stack is inserted in substrate holes is a "full-3D"

TFB. A TFB in which only two layers of a three-layer stack are inserted in substrate holes is a "semi-3D" TFB.

In some embodiments, a separator and/or second electrode may be EPDd on a first electrode which is formed by another method. For example, in one embodiment, a separator and/or an anode may be EPDd on an electrodeposited CuS or MoS cathode, on both planar and 3D perforated substrates.

In some embodiments, an EPDd TFB disclosed herein is a Li-ion TFB. In some embodiments of a semi-3D or full-3D EPDd Li-ion TFB, the cathode is made of a lithiated metal phosphate. In particular embodiments, the lithiated metal phosphate is LiFePO$_4$ (henceforth referred to as "LFP"). In some embodiments, the separator is in the form of a composite solid thin-film electrolyte or a composite ceramic hybrid electrolyte. In the hybrid electrolyte, ionic conductivity may be provided by impregnating an inorganic porous solid with a liquid, for example EC/DEC 1M LiPF6. In some embodiments in which the ion-conducting electrolyte is a non-impregnated composite solid, the porous solid is sintered after the formation of the anode layer, with the goal of decreasing porosity and grain-boundary resistance. In some embodiments which provide a "solid state TFB", the sintering is applied to the entire battery structure.

In some embodiments, the anode includes graphite or meso-carbon micro-beads (MCMB), or nanotubes. In other embodiments, the anode includes nano-silicon. In some embodiments, the anode and/or the cathode may be co-deposited with an electronically conducting material, such as carbon or/and graphite powders.

Particles useful in the EPD of TFB structures described herein can be in the nanometer to micrometer range. Large particles can be ball-milled to small diameters, down to submicron and even nanometer range. In some embodiments, an EPDd layer includes two or more types of different micro- and nano-sized particles. In some embodiments, the particle size is less than 10 μm. In some embodiments, the particles size is less than 1 μm. In some embodiments, the particle size is less than 100 nm.

In some embodiments, the anode and/or cathode powders may be pre-coated by one or more (e.g. up to 10) monolayers of carbon prior to EPD. In some embodiments, EPDd 2D-TFBs and 3D-TFBs are coated and sealed with an EPDd PEEK packaging layer. Additional polymers that can be EPDd to serve as battery packaging layer include Nylon-MXD6 (a copolymer of m-Xylenediamine and Adipic acid), PVDC (plasticized Vinylidene Chloride copolymer) and EVOH copolymer (Ethylene Vinyl Alcohol copolymer).

2D-TFBs according to embodiments disclosed herein may be formed on large (a few square inches to a few square meters) to very large (a few tens of square meters) surfaces, which need not be flat. Such 2D-TFBs may be formed on any conductive surface or non-conductive surface coated with a conductive layer which serves as current collector/deposition electrode.

Suitable positive electrode (cathode) materials include ordered rock-salt compounds such as LiCoO$_2$, LiNiO$_2$, Li(Al,Ni,Mn)O$_2$, LiMnO$_2$, and solid solutions or doped combinations thereof; spinel structure compounds such as LiMn$_2$O$_4$ and its doped counterparts or solid solutions with other metal oxides; ordered olivines such as LiFePO$_4$, LiMnPO$_4$, LiCoPO$_4$, and their doped counterparts or solid solutions; and other ordered transition metal phosphates such as those of so-called Nasicon structure type and their derivatives and related structures.

Suitable negative electrode (anode) materials include compounds such as graphitic or disordered carbons; metal oxides that intercalate lithium such as Li$_4$Ti$_5$O$_{12}$ spinel and its derivatives; and other metal oxides or their solid solutions that undergo intercalation or displacement reactions such as tin oxide, indium tin oxide, or first-row transition metal oxides; and crystalline or amorphous metals and alloys of metals or metalloids such as Si, Al, Zn, Sn, Ag, Sb, and Bi.

Suitable composite ceramic hybrid electrolyte materials include ceramic powders like ZrO$_2$, Zr$_2$O$_3$, SiO$_2$, Al$_2$O$_3$, LiAlO$_2$ and polymer binders like PEO, polyethylenimine (PEI), polyvinyldiene fluoride (PVDF), PEG, PMMA, methylcellulose, alkyd resin, dewaxed shellac, polyvinyl butyral (PVB), polyvinyl alcohol (PVA) and poly(dimethyldiallylammonium chloride) (PDDA). The ceramic material is impregnated with a liquid electrolyte typically used for lithium-ion batteries. Exemplarily, the liquid electrolyte may be LiPF$_6$:EC:DEC.

Suitable inorganic solid separator materials include lithium-ion conductive glasses such as lithium zirconate, lithium aluminate, lithium silicate, LiCl—Li$_2$O—SiO$_2$—P$_2$O$_5$, LiCl—Li$_2$O—SiO$_2$—P$_2$O$_5$, sulfide-based glasses like Li$_2$S—SiS$_2$—Al$_2$S$_3$ and Li$_2$S—SiS$_2$—P$_2$S$_5$, Li$_2$S—SiS$_2$—Li$_3$N, lithiated boron oxide glasses of the family xLi$_2$O—B$_2$O$_3$ and lithium ion conducting glass ceramics like Li$_2$O—Al$_2$O$_3$—SiO$_2$—P$_2$O$_5$—TiO$_2$—GeO$_2$ and Li$_2$O—Al$_2$O$_3$—SiO$_2$—P$_2$O$_5$-T$_i$O$_2$. The solid electrolyte layers are preferably 1 to 10 μm thick to eliminate high ohmic resistance at RT. Alternatively, they can be thicker than about 10 μm if used at elevated temperatures (such as 60-70 C.).

Suitable solvents for use in the EPD of various materials may be found for example in Table 3 of L. Besra and M. Liu, Progress in Materials Science, 52 (2007) 1-61.

The electrophoretic deposition may be enhanced by use of additives. Useful additives include but are not limited to conductive particles that increase the electrical conductivity of the deposited material, such as conductive carbon, metallic particles, or conductive polymer dispersions, or binders that improve the adherence of the deposited particles to each other or to a current collector. Other exemplary additives which may be used for this purpose are described for example in U.S. Pat. No. 7,662,265.

BRIEF DESCRIPTION OF THE DRAWINGS

Aspects, embodiments and features disclosed herein will become apparent from the following detailed description when considered in conjunction with the accompanying drawings. In the drawings:

FIG. 4A shows an SEM image of a YSZ-PEI membrane deposited by EPD on a previously EPDd MCMB anode in a planar configuration;

FIG. 4B shows SEM images of YSZ-PEI membranes EPDd from an acidic suspension (pH2) containing 10% PEI without iodine;

DETAILED DESCRIPTION

Figure 1:
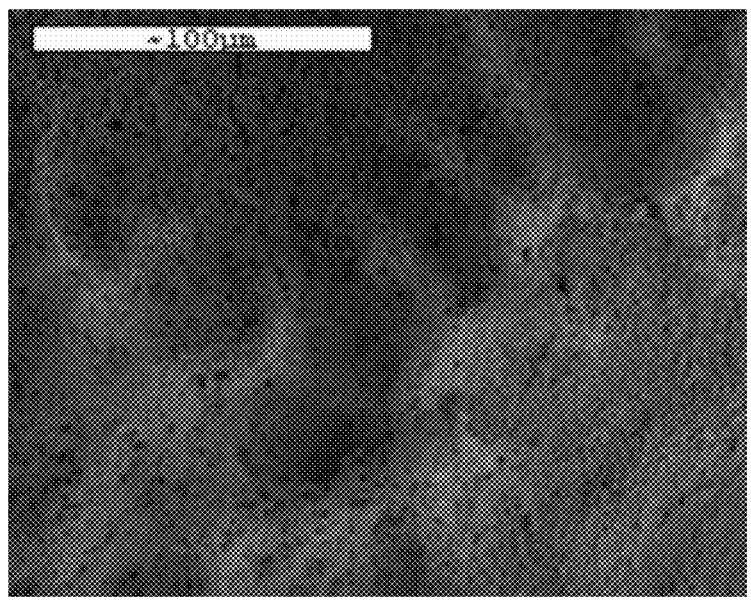
FIG. 1 is a low magnification SEM view of a YSZ separator EPDd on a previously EPDd LFP cathode in a planar configuration.

The inventors found surprisingly that three-layer (first electrode/separator/second electrode) thin film battery stacks can be EPDd in sequence on a single conductive substrate in both 2D and 3D configurations. The conductive substrate may be a metal or a thin-film current collector deposited on a non-conducting substrate (e.g. plastic or glass) or on a semi-conductor substrate (like silicon). In some embodiments, an electrode may be electrically conductive enough to serve as current collector. If necessary, a second current collector is provided to form a full energy storage cell, which can be packaged in various packages. In some embodiments, the separator includes an inorganic porous solid, which, as mentioned, provides pathways for cations which reduce on the first EPDd electrode. Its porosity depends on the deposition conditions and may vary from 20-80%. In some embodiments, the porous solid is impregnated with an ion-conductive electrolyte to provide a "composite ceramic electrolyte". Exemplarily, the electrolyte may be $LiPF_6$:EC:DEC with a 2% volume VC (vinylene carbonate) solution, or a N-methyl-N-propylpyrrolidinium bis(trifluoromethanesulfonyl)imide ($PYR_{13}TFSI$) RT ionic liquid (IL) and LiTFSI salt. The impregnation is carried out after the deposition of the entire battery stack. In other embodiments, the separator is a composite solid thin-film electrolyte which includes Li ion conducting, but electronically non-conducting crystalline materials (such as oxide perovskites, $La_{0.5}Li_{0.5}TiO_3$, thio-LISICON, $Li_{3.25}Ge_{0.25}P_{0.75}S_4$, glass-ceramics, glassy materials (e.g. $Li_2S$—$SiS_2$—$Li_3PO_4$), $Li_{10}GeP_2S_{12}$, lithium sulfide, lithium iodide, lithium nitride and/or a mixture thereof. In particular, a wide variety of glass ceramic systems useful as ion-conducting separators exist, for example the $Li_2O\times Al_2O_3\times nSiO_2$-system (LAS-system), the $MgO\times Al_2O_3\times nSiO_2$-system (MAS-system) and the $ZnO\times Al_2O_3\times nSiO_2$-System (ZAS-system). Note that after EPD, all separators are porous (i.e. include a porous solid) in order to enable further EPD of a second electrode. The porosity of a Li-ion conducting solid separator may be reduced significantly by additional sintering.

The EPDd first electrode can serve as a deposition electrode for the EPD of an electronically insulating and ionically conducting separator. Unexpectedly and advantageously, the first electrode/separator stack was found able to serve as a deposition electrode in the EPD of the second electrode. This is enabled by the porosity of the separator solid, which allows cation (proton) motion to the first electrode. In some embodiments, the porous separator was EPDd as a conformal layer on a first electrode previously EPDd inside holes of a perforated substrate. Thus, previously unachievable and unknown conformal separators which include a porous solid could be obtained for semi-3D and full-3D TFB configurations (i.e. CMBs) inside perforated substrates. Even more surprisingly, the inventors found that the second electrode could be EPDd as a conformal layer over the conformal separator above, i.e. all three layers could be EPDd in sequence inside perforations. That is, concentric microbatteries (CMBs) inside holes could be formed entirely by EPD. In some embodiments, the inventors found that the porous separator EPDd inside holes could be sintered and used for ionic conduction without impregnation by an ionically conducting liquid.

The following examples illustrate the sequential EPD of two-layer and three-layer TFB stacks on a single conductive substrate in both 2D and 3D configurations, and 2D-TFBs and 3D-TFBs obtained by EPD.

EXAMPLE 1

Two-Layer $LiFePO_4/ZrO_2$ (8% $Y_2O_3$)$_2$ Stack on a Planar Substrate

Figure 2:
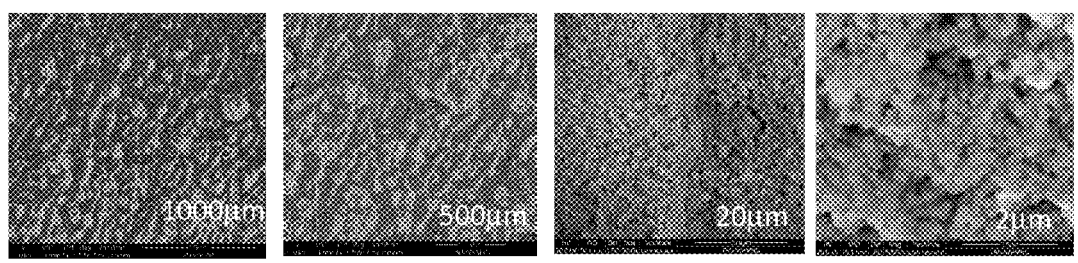
FIG. 2 shows high resolution SEM views at different magnifications of the YSZ layer in FIG. 1.

A two-layer $LFP/ZrO_2$ (8% $Y_2O_3$) stack was prepared by EPD on a planar substrate. $ZrO_2$ (8%$Y_2O_3$) will be referred to henceforth as "YSZ". FIG. 1 shows a low magnification SEM view of the YSZ layer, having a porosity of between 40-50%. FIG. 2 shows high-resolution SEM images of the same layer at different magnifications.

LFP powder (Hydro Quebec, Canada), black-pearl carbon (BP) and PVDF were dispersed in an acetone solution with 0.28 mg/L. The weight percentage ratio of LFP:BP:PVDF was (91:4:5%). In one case, 0.4% v/v polymer triton-X 100 (TTX, ($C_{14}H_{22}O(C_2H_4O)n$)) was added to the dispersion. Black-pearl carbon and PVDF were used as conducting and binding materials, respectively. The modification of the film with TTX caused smoother and more homogeneous deposition during the EPD process. The addition of iodine produces charged particles (protons) in the solution through chemical reaction of $I_2$ with acetone. The reaction may be written as follows:

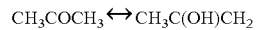

$$CH_3COCH_3 \leftrightarrow CH_3C(OH)CH_2$$

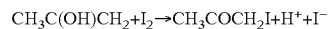

$$CH_3C(OH)CH_2 + I_2 \rightarrow CH_3COCH_2I + H^+ + I^-$$

A nickel disk was used as a substrate (working electrode) and a graphite plate was used as a counter electrode. The constant voltage applied between the two electrodes was set at 60V for 60 seconds. The mass of the EPDd LFP deposit was 9 mg.

The YSZ membrane was prepared by cathodic EPD on the LFP cathode (which served as working electrode), using a deposition bath with the following composition: 250 ml Ethanol, 0.7 gr YSZ, 4 ml Acetone, 2 ml water, 0.4 ml Acetylacetone, 0.027 gr Iodine and 0.0105 gr PEI (PolyEthylene Imine). As before, the graphite plate served as counter electrode. The working distance between the electrodes was 15 mm. The deposition solution preparation was carried in two steps: preparation of solution 1 containing 150 ml Ethanol, 0.4 ml Acetylacetone and 0.7 gr YSZ in one container and stifling overnight; and preparation of solution 2 containing 100 ml Ethanol, 2 ml deionized water, 4 ml acetone and 0.027 gr iodine and stifling for a few minutes. Solutions 1 and 2 where then mixed and placed in an ultrasonic bath. EPD was carried out at room temperature (RT) and atmospheric conditions using a Keithley 2400 source-meter. The addition of iodine produced protons in the solution, as explained above. Some of the protons were adsorbed on the $ZrO_2$ particles, rendering them positively charged. The addition of PEI to the solution helped to obtain a smoother, adherent film. The YSZ deposition was carried out at a constant current of 1.6 $mA/cm^2$ for 10 minutes, and resulted in a highly adherent conformal deposit on the LFP cathode.

Figure 3A:
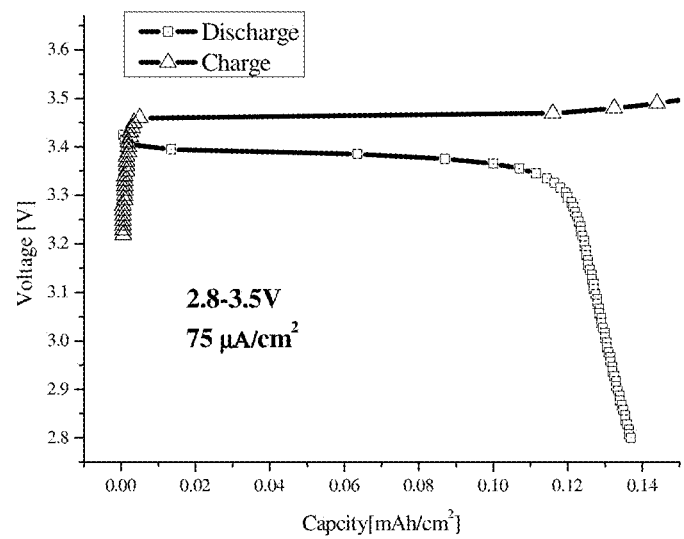
FIG. 3A shows charge-discharge curves of an assembly of EPDd planar LFP cathode/YSZ LiPF6 EC:DEC VC tested in a coin cell configuration with a Li foil serving as anode.
Figure 3B:
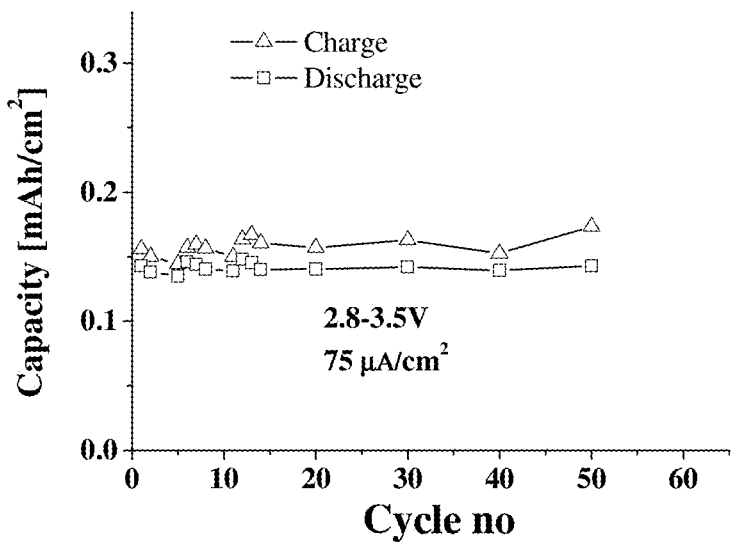
FIG. 3B shows cycling results of the assembly in FIG. 3A.

A LFP cathode/YSZ-PEI assembly EPDd as above was tested in a coin cell configuration, with a Li foil serving as anode. The YSZ-PEI membrane was impregnated with LiPF$_6$:EC:DEC electrolyte with an added 2% volume VC solution. The VC solution improves solid electrolyte interphase (SEI) properties. The configuration was sealed in a stainless steel coin cell. The Li/YSZ/LFP cells were cycled at RT using a Maccor series 2000 battery test system Charge-discharge curves and cycling results are shown in FIGS. 3A and 3B. The voltage cut-off was 2.8 to 3.5V, with a charge/discharge at a current density of 75 μA/cm$^2$. The cells provided 0.1-0.2 mAh/cm$^2$ capacity for more than 50 reversible cycles. The Faradaic efficiency was close to 100%.

EXAMPLE 2

Two-Layer LiFePO$_4$/LiAlO$_2$ Stack on a Planar Substrate

A two-layer LFP/LiAlO$_2$ stack was prepared by EPD on a Ni planar current collector substrate. First, the LFP cathode was deposited as in Example 1. The LiAlO$_2$ membrane was then deposited by cathodic EPD on the LFP, using a deposition bath with the following composition: 250 ml Ethanol, 0.7 gr LiAlO$_2$, 4 ml Acetone, 2 ml water, 0.4 ml Acetylacetone, 0.027 gr Iodine and 0.0105 gr PEI. The deposition solution preparation was carried in two steps: preparation of solution 1 containing 150 ml Ethanol, 0.5 ml Acetylacetone and 0.8 gr LiAlO$_2$ in one container with overnight stirring, and preparation of solution 2 containing 100 ml Ethanol, 3 ml deionized water, 4.5 ml acetone and 0.035 gr iodine with stifling for a few minutes. Solutions 1 and 2 where then mixed and placed in an ultrasonic bath for 20 minutes. 0.0105 gr of PEI was then added to the mixed solution.

The EPD of LiAlO$_2$ was carried out at RT under atmospheric conditions using a Keithley 2400 source-meter, with the LFP as working electrode and a graphite plate distanced 15 mm therefrom as counter electrode. The LiAlO$_2$ EPD was carried out at a constant current of 1.6 mA/cm$^2$ for 10 minutes. The result was a highly adherent conformal LiAlO$_2$ deposit. LiImide:PEG500 electrolyte was then dripped onto the surface of the LiAlO$_2$ and the materials dried.

The two-layer LiFePO$_4$/LiAlO$_2$ stack was soaked in LiImide:PEG500 liquid electrolyte under vacuum for 30 min and left overnight in the solution. An assembly of EPDd LFP cathode/LiAlO$_2$—LiImide:PEG500 was tested in a coin cell configuration with a Li foil serving as anode. The configuration was sealed in a stainless steel coin cell. The Li/LiAlO$_2$/LFP cells were cycled at RT using a Maccor series 2000 battery test system and exhibited the typical behavior of a Li TFB.

EXAMPLE 3

Two-Layer MCMB/YSZ Stack on a Planar Substrate

A MCMB anode was deposited by cathodic EPD on a Ni current collector using a deposition bath with the following composition: 250 ml Ethanol, 0.9 gr MCMB, 4.5 ml Acetone, 2 ml water, 0.5 ml Acetylacetone, 0.05 gr Iodine and 0.008 gr PEI. The deposition solution preparation was carried in two steps: preparation of solution 1 containing 150 ml Ethanol, 0.4 ml Acetylacetone and 0.7 gr MCMB in one container with stirring for a few minutes; and preparation of solution 2 containing 100 ml Ethanol, 2 ml deionized water, 4 ml Acetone and 0.05 gr Iodine with stifling for a few minutes. Solutions 1 and 2 where then mixed and placed in an ultrasonic bath for 20 minutes. 0.007 gr of PEI was then added to the solution. EPD was carried out using the Keithley 2400 source-meter at RT under atmospheric conditions, at a constant voltage of 100V for 120 seconds. The YSZ separator layer was prepared as in Example 1, providing a highly adherent conformal deposit on the MCMB. The resulting membrane structure is shown in FIG. 4A. FIG. 4B shows SEM images of two-layer MCMB-membrane stack with a YSZ-PEI membrane EPDd from an acidic suspension (pH 2) containing 10% PEI. The YSZ-PEI deposition was performed at 200V using 5-10 pulses of 10 s each. Lowering of the pH enabled using a solution without iodide for EPD.

EXAMPLE 4

Two-Layer MCMB/LiAlO$_2$ Stack on Planar Substrate

A MCMB anode was deposited by cathodic EPD on a Ni current collector as in Example 3. A LiAlO$_2$ membrane was deposited on the MCMB anode using the electrolyte described in Example 2. 10% (v/v) PEGDME was added to the suspension. The membrane was deposited by pulse potential cathodic EPD. The applied voltage was 100V and the deposition was carried out stepwise. The duration of each step was 30 sec. Between the deposition steps, the sample was removed from the suspension and dried under ambient conditions until complete evaporation of the solvent.

Figure 5:
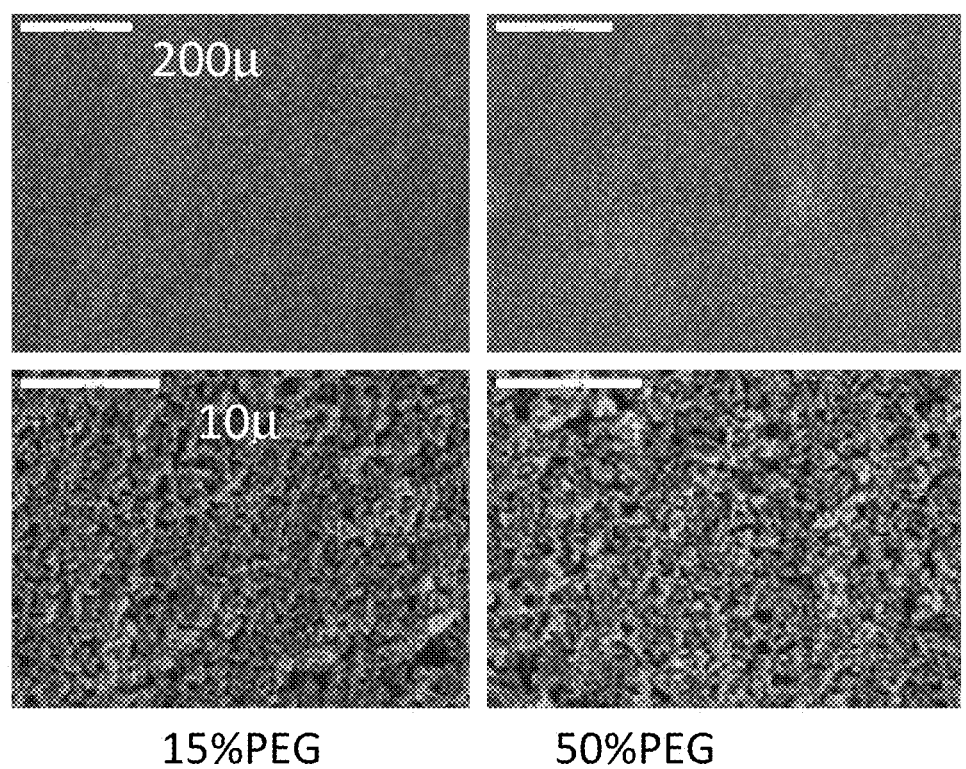
FIG. 5 shows SEM images of LiAlO$_2$-PEG membranes EPDd on a previously EPDd MCMB anode.

FIG. 5 shows SEM views of LiAlO$_2$-based membranes deposited by EPD from suspensions containing two different concentrations (15% and 50%) of PEG-polymer binder. A wide concentration range of polymer can be used in the suspension. Better uniformity and porosity can be achieved when the suspension contains 15% PEG. TGA tests indicated that the polymer concentration in the EPD layers did not exceed 3.5-5.5%.

Figure 6A:
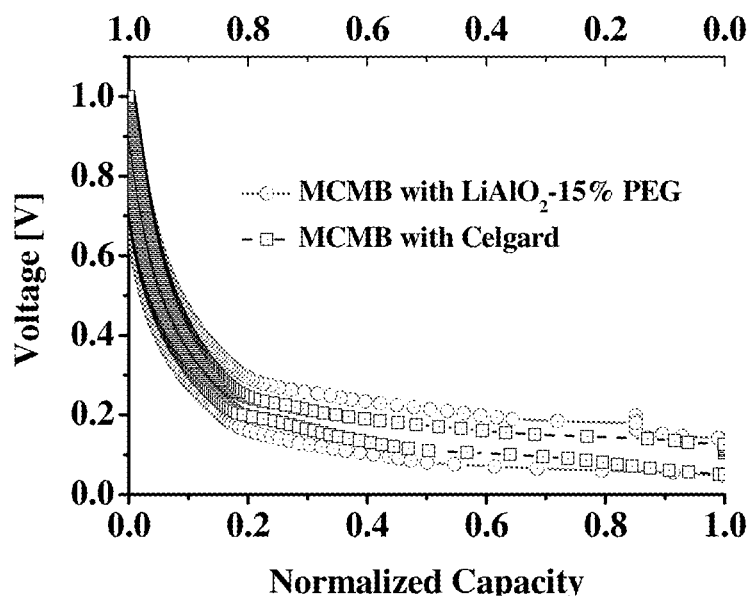
FIG. 6A shows charge-discharge curves of an assembly of EPDd planar assembly MCMB/(LiAlO2)-15% PEG LiPF6 EC:DEC/Li and of a cell with a commercial Celgard membrane for comparison.
Figure 6B:
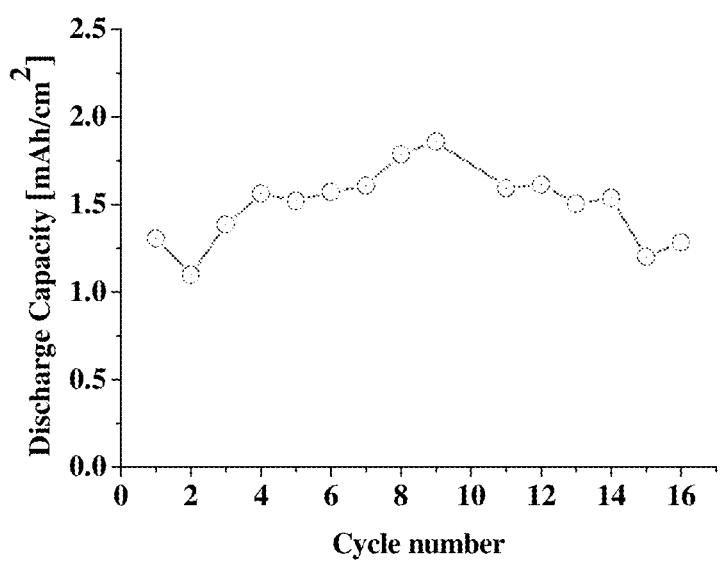
FIG. 6B shows cyclability data for the MCMB/(LiAlO2)-15% PEG LiPF6 EC:DEC/Li cell in FIG. 6A.

An assembly of EPDd MCMB anode/LiAlO$_2$-PEG with LiPF$_6$:EC:DEC 2% VC was tested in a coin cell configuration with a Li foil serving as counter electrode. The configuration was sealed in a stainless steel coin cell. FIG. 6A shows a discharge curve of the Li/LiAlO$_2$-15% PEG/MCMB cell. FIG. 6B shows cyclability data for this cell. The comparison of the cell voltage profile with that of a similar cell including a commercial Celgard membrane proves the feasibility of using the disclosed membrane for Li-ion cells.

EXAMPLE 5

Three-Layer LiFePO$_4$/YSZ/MCMB Stack on Planar Substrate

A three-layer LFP/YSZ/MCMB stack was prepared by EPD on a planar Ni current collector. All three layers were EPDd in sequence on the single Ni current collector. The cathode and separator layers were EPDd as in Example 1. The MCMB anode was subsequently deposited by cathodic EPD on the YSZ using a deposition bath described in Example 3. The Ni/LFP/YSZ assembly was used as working electrode and a graphite plate was used as a counter electrode, with a working distance of 15 mm between the electrodes. The inventors found that unexpectedly, while YSZ is an electronically non-conductive separator, its high porosity (here ca. 60%) enables high proton mobility inside pores and hydrogen evolution reaction on the electronically conducting Ni/LFP surface, assisting the EPD of the MCMB layer. The MCMB is electronically conductive enough to also serve as an anode current collector.

Figure 7:
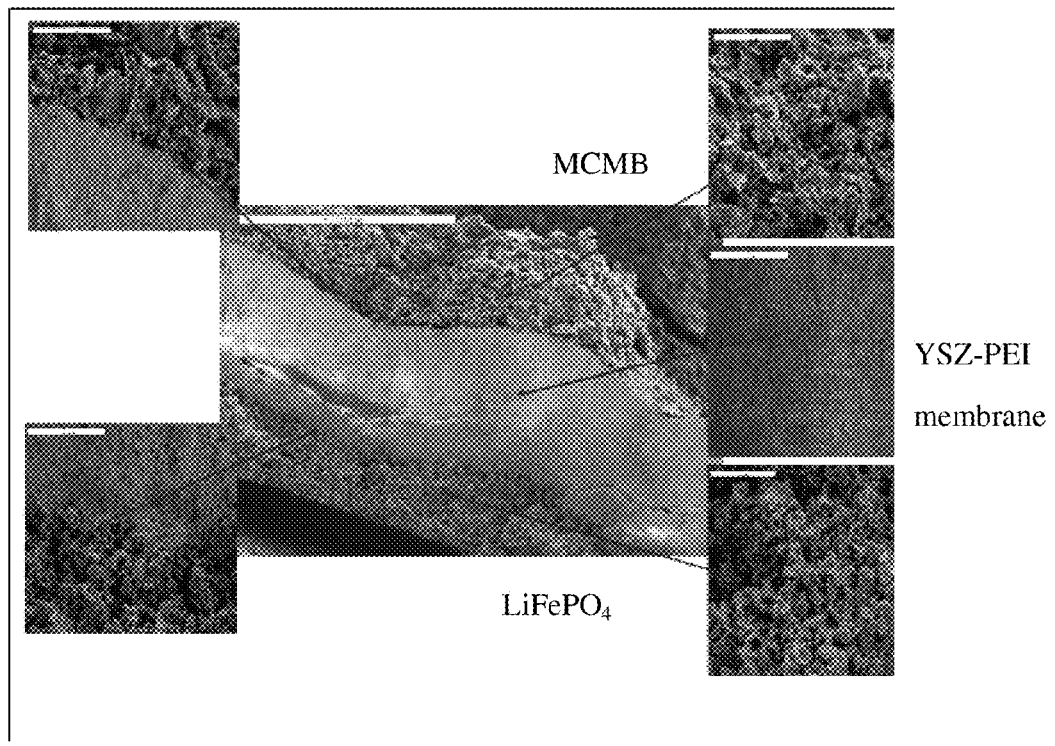
FIG. 7 shows details of the layers in a cross section of an EPDd three-layer LFP/YSZ/MCMB stack on a single planar conductive substrate.

FIG. 7 shows a cross section of the EPDd three-layer LFP/YSZ/MCMB stack. One can get a rough measure of both layer thicknesses and layer porosities. Here, the separator thickness is roughly 110-120 μm, the thickness of the MCMB anode is roughly 80-90 μm and the thickness of the cathode LFP is roughly 70-80 μm. In general, the thickness of each layer can be controlled by (among others) controlling the deposition time, and can be made much thinner. Specifically, the YSZ separator may be made thinner than 10 μm, thinner than 5 μm and even thinner than 2 μm.

EXAMPLE 6

Two-Layer LiFePO$_4$/YSZ Stack on Perforated (3D) Substrate

Figure 8:
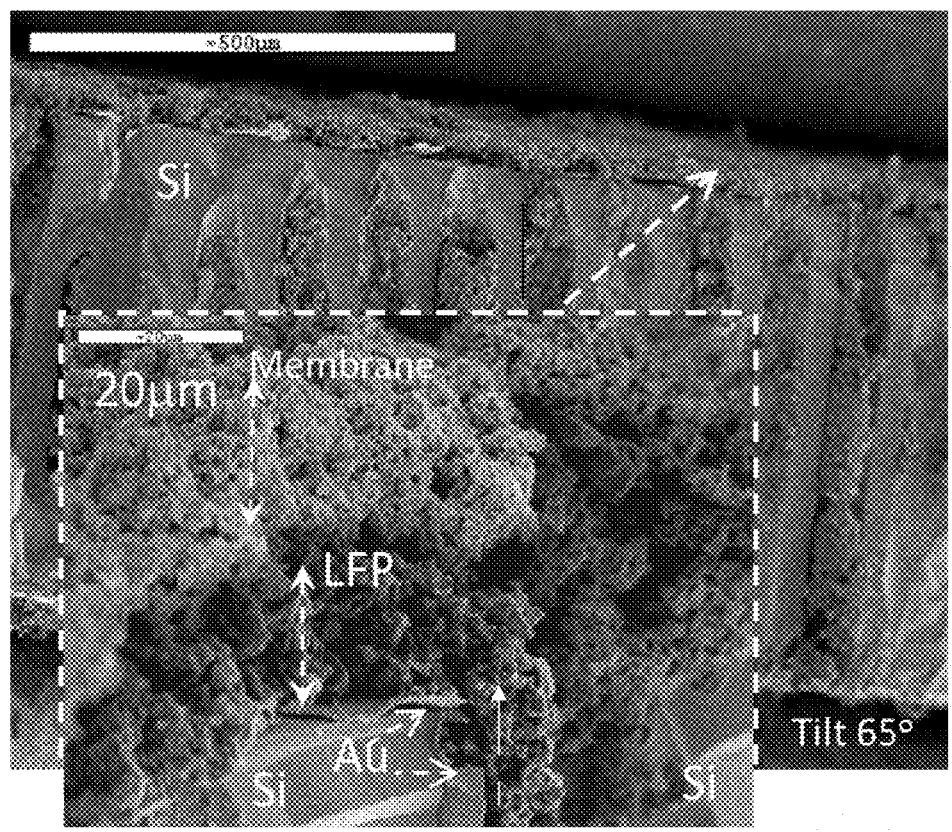
FIG. 8 shows a tilted cross-section SEM view of a perforated 3D Si substrate coated with Au and an EPDd two-layer LFP-YSZ (PEI) structure.

A two-layer LFP/YSZ stack was prepared by EPD on a 3D perforated substrate which had a previously electrolessly deposited thin (1-2 μm) Au layer on all available surfaces. A tilted SEM picture of the stack is shown in FIG. 8. The two-layer LFP/YSZ stack was EPDd inside 50 μm diameter holes in a 500 μm thick silicon substrate as well as on all remaining planar surfaces. The hole aspect ratio (length/diameter) was 10:1. The preparation of the solution and deposition of the LFP were performed as in Example 1, except that two graphite plate counter electrodes were positioned in parallel, one on each side of the Si substrate, each at a distance of ca. 15 mm from a respective surface of the Si. The preparation of the solution and the deposition of the YSZ layer were also performed as in Example 1. The thickness of the separator so formed was about 10 μm.

The 3D LFP/YSZ stack was tested in a coin cell configuration with a Li foil serving as anode. This configuration forms a so-called "semi-3D" TFB. The Li foil was brought into an intimate contact with the YSZ on the top surface of the substrate. The electrolyte was LiPF$_6$:EC:DEC with a 2% volume VC solution. The configuration was sealed in a stainless steel coin cell. The Li/YSZ/LFP cells were tested at RT using a Maccor series 2000 battery test system. A stable OCV of 3.6V was measured. The testing proved that the assembly performs as a Li battery.

EXAMPLE 7

Three-Layer LiFePO$_4$/YSZ/MCMB Stack on Perforated (3D) Substrate

A three-layer LFP/YSZ/MCMB stack was prepared by EPD on a 3D perforated substrate. First, a LFP/YSZ stack was prepared on a Ni coated Si perforated substrate as in Example 1. Two graphite plate counter electrodes were positioned in parallel, one on each side of the Si substrate, each at a distance of ca. 15 mm from a respective surface of the Si. A MCMB anode was subsequently deposited by cathodic EPD on the YSZ as in Example 3. The MCMB was electronically conductive enough to also serve as anode current collector. The resulting structure was one of a concentric electrode/separator/electrode stack formed in each hole in the perforated substrate and also formed on the remaining planar surfaces of the substrate. This configuration forms a so-called "full-3D" TFB.

EXAMPLE 8

Improvement of LiFePO$_4$ Conductivity

Figure 9A:
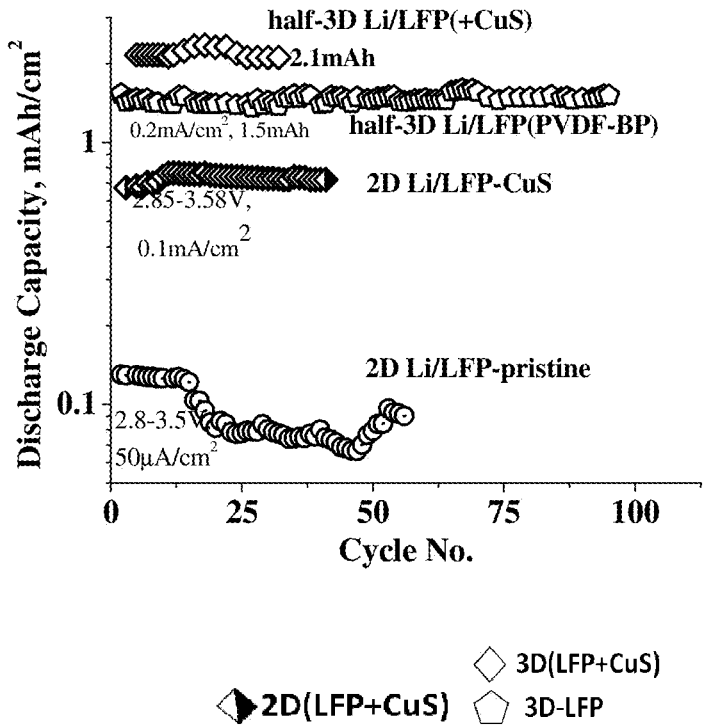
FIG. 9A shows polarization curves of 2D and semi-3D cells with EPDd LFP cathode modified with CuS.

A topcoat material with high mixed electron/ion conductivity (exemplarily copper sulfide (CuS)) was used to improve the conductivity of composite LFP electrodes prepared by EPD. CuS was electrochemically synthesized on the EPDd LFP cathode with the use of procedure described in H. Mazor et al., Electrochemical and Solid-State Letters, 12, (2009), A232-A235. The CuS was deposited on both 2D and 3D Si substrates over the LFP. Planar and semi-3D cells comprising an Au cathode current collector, an EPDd LFP cathode modified by CuS layer, a Celgard separator soaked in commercial electrolyte (LiPF$_6$ in 1:1 EC:DEC) and a lithium anode were assembled and tested. As shown in FIG. 9A, a semi-3D cell exhibited a 1.5-2.3 mAhcm$^{-2}$ (per battery footprint) reversible capacity. The capacity values were stable for 100 cycles with a degradation rate of 0.01% capacity loss per cycle. The capacity of the planar cell was 10 times lower. This agrees with the geometrical-area gain (AG=9) of the perforated Si substrate.

Figure 9B:
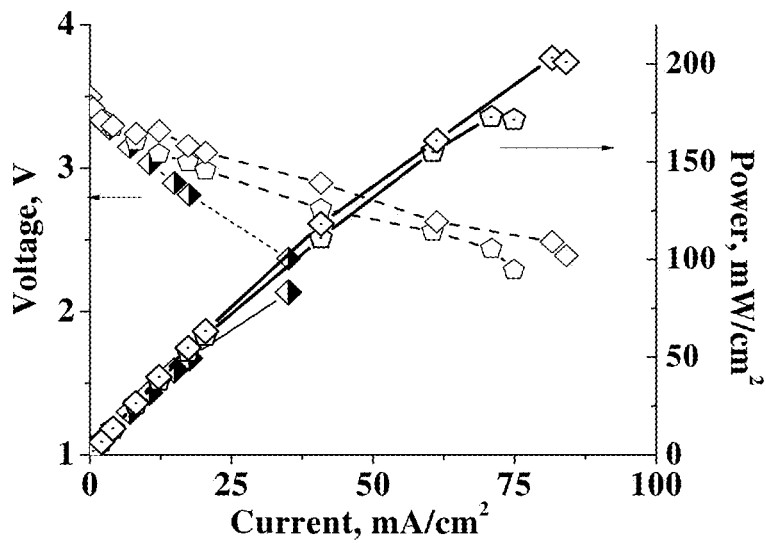
FIG. 9B shows cyclability data of 2D and semi-3D cells with EPDd LFP cathode modified with CuS.

FIG. 9B shows polarization curves of 2D and semi-3D cells with EPDd LFP cathode modified by CuS. Both cathodes were deposited under similar conditions and both contained LFP, black-pearl carbon, PVDF binder (ratio 91:4:5% (w/w)) and TTX-100. The pulse duration was one second followed by a rest period of 20 seconds. As can be seen from the graph, the transition from 2D to 3D architecture is followed by an increase in maximum current-density capability from 30 to 75 mAcm$^2$. The semi-3D cells with CuS-coated modified LFP electrodes were able to provide more than 85 mAcm$^2$ current density and 204 mWcm$^{-2}$ peak power per battery footprint, a 24% increase over the semi-3D non-CuS coated LFP cell and a significant enhancement in comparison with the 2D LFP cell.

EXAMPLE 9

Three-Layer LiFePO$_4$/Li$_2$O—Al$_2$O$_3$—SiO$_2$—P$_2$O$_5$—TiO$_2$/MCMB Stack on Planar Substrate A 3-layer planar LFP/Li$_2$O—Al$_2$O$_3$—SiO$_2$—P$_2$O$_5$—TiO$_2$/MCMB structure with solid electrolyte was EPDd on a single Ni current collector. The LFP layer was deposited as in Example 1. The Li$_2$O—Al$_2$O$_3$—SiO$_2$—P$_2$O$_5$—TiO$_2$ is a glass-ceramic available commercially in powder form from OHARA Ltd, and described exemplarily in U.S. patent application 20080289365. The powder was ball-milled for 24 hours before preparation of the suspension for EPD. The Li$_2$O—Al$_2$O$_3$—SiO$_2$—P$_2$O$_5$—TiO$_2$ was then EPDd under the same conditions as the LiAlO$_2$ in the Example 2. The MCMB anode was then EPDd as in Example 3 on the LFP/glass-ceramic stack.

EXAMPLE 10

Three-Layer MCMB/LiAlO$_2$/LFP Stack on Perforated Si Substrate Coated by Ni Current Collector A MCMB anode was deposited by cathodic EPD on a 3D-perforated Si substrate coated by Ni current collector. The thickness of nickel layer was 5 μm to eliminate co-intercalation of lithium to the silicon substrate trough pits of Ni. A MCMB anode was deposited as in Example 3. A LiAlO$_2$ membrane was deposited on the MCMB anode using the electrolyte described in Examples 2 and 4. The LFP cathode was EPDd on the LiAlO$_2$ membrane-PEG membrane using the procedure described for LFP in the Example 1. A 3D-assembly of EPDd MCMB anode/LiAlO$_2$-PEG/LFP with impregnated LiPF$_6$:EC:DEC 2% VC was tested in a coin cell configuration. The configuration was sealed in a stainless steel coin cell.

EXAMPLE 11

EPD of PEEK Protective and Pre-Packaging Layer

A polyaromatic, semicrystalline thermoplastic polymer, Polyetheretherketone (PEEK), (—$C_6H_4$—O—$C_6H_4$—O—$C_6H_4$—CO—)n, was electrophoretically deposited on the LFP/$Li_2O$—$Al_2O_3$—$SiO_2$—$P_2O_5$—$TiO_2$/MCMB structure prepared as in Example 9. A Ni coated substrate was placed in the EPD bath as a cathode between two graphite plates connected to the anode CC. PEEK suspensions were prepared by magnetic stifling of 2 g PEEK powder (Victrex, UK) in 250 mL ethanol. The stirring was conducted for 3 hours, followed by 30 min ultrasonic treatment. The suspension was mixed with the second bath containing 4 ml Acetone, 2 ml water, 0.5 ml Acetylacetone and 0.04 gr Iodine. An additional 30 min ultrasonic treatment was then carried out. A small area surrounding the current collector contacts was shielded. PEEK EPD was carried our at an applied voltage was 140V stepwise with 30 sec per step. The as-deposited PEEK layer was porous. The final PEEK/Ni/LFP/$Li_2O$—$Al_2O_3$—$SiO_2$—$P_2O_5$—$TiO_2$/MCMB/PEEK structure was dried in vacuum at 100 C for 7 hours. After drying, the sample was heated at 350 C for 20 minutes to provide a dense PEEK polymer coating, which serves as a protective and pre-packaging layer of the battery to eliminate penetration of moisture and oxygen.

While this disclosure describes a limited number of embodiments, it will be appreciated that many variations, modifications and other applications of such embodiments may be made. The disclosure is to be understood as not limited by the specific embodiments described herein, but only by the scope of the appended claims.

All patents, patent applications and publications mentioned in this specification are herein incorporated in their entirety by reference into the specification, to the same extent as if each individual patent, patent application or publication was specifically and individually indicated to be incorporated herein by reference. In addition, citation or identification of any reference in this application shall not be construed as an admission that such reference is available as prior art.

The invention claimed is:

1. A method, comprising the steps of:
   a) forming on a substrate a first polarity thin film battery electrode comprising a first active material; and
   b) electrophoretically depositing on the first polarity battery electrode a glass-ceramic material to serve as a battery separator.

2. The method of claim 1, wherein the substrate is planar.

3. The method of claim 1, wherein the substrate is a perforated three-dimensional substrate.

4. The method of claim 3, wherein the perforated substrate includes at least one through-hole.

5. The method of claim 1, further comprising the step of electrophoretically depositing on the glass-ceramic material a second polarity thin film battery electrode comprising a second active material, the second polarity being opposed to the first polarity.

6. The method of claim 5, further comprising the step of rendering the glass-ceramic battery separator ion-conductive.

7. The method of claim 2, further comprising the step of electrophoretically depositing on the glass-ceramic material a second polarity thin film battery electrode comprising a second active material, the second polarity being opposed to the first polarity.

8. The method of claim 7, further comprising the step of rendering the glass-ceramic battery separator ion-conductive.

9. The method of claim 3, further comprising the step of electrophoretically depositing on the glass-ceramic material a second polarity thin film battery electrode comprising a second active material, the second polarity being opposed to the first polarity.

10. The method of claim 9, further comprising the step of rendering the glass-ceramic battery separator ion-conductive.

11. The method of claim 4, further comprising the step of electrophoretically depositing on the glass-ceramic material a second polarity thin film battery electrode comprising a second active material, the second polarity being opposed to the first polarity.

12. The method of claim 11, further comprising the step of rendering the glass-ceramic battery separator ion-conductive.

13. The method of claim 1, wherein the first active material includes a lithiated active material and wherein the glass-ceramic material includes a lithiated glass-ceramic.

14. The method of claim 2, wherein the first active material includes a lithiated active material and wherein the glass-ceramic material includes a lithiated glass-ceramic.

15. The method of claim 3, wherein the first active material includes a lithiated active material and wherein the glass-ceramic material includes a lithiated glass-ceramic.

16. The method of claim 4, wherein the first active material includes a lithiated active material and wherein the glass-ceramic material includes a lithiated glass-ceramic.

17. The method of claim 13, wherein the second active material includes carbon.

18. The method of claim 14, wherein the second active material includes carbon.

19. The method of claim 15, wherein the second active material includes carbon.

20. The method of claim 16, wherein the second active material includes carbon.

* * * * *